United States Patent
Masi et al.

(10) Patent No.: US 6,730,627 B1
(45) Date of Patent: May 4, 2004

(54) SOLID COMPONENT OF CATALYST FOR THE (CO) POLYMERIZATION OF ETHYLENE AND α-OLEFINS

(75) Inventors: Francesco Masi, San Donato Milanese (IT); Lia Barazzoni, Piacenza (IT); Francesco Menconi, Massa Macinaia (IT); Renzo Invernizzi, Milan (IT); Sergio Masini, Ragusa (IT); Cesare Ferrero, Monza (IT); Angelo Moalli, Castelletto Ticino (IT)

(73) Assignee: ECP Enichem Polimeri S.r.l., Milan (IT)

( * ) Notice: Subject to any disclaimer, the term of this patent is extended or adjusted under 35 U.S.C. 154(b) by 1,826 days.

(21) Appl. No.: 08/317,826

(22) Filed: Oct. 4, 1994

Related U.S. Application Data

(63) Continuation of application No. 07/912,232, filed on Jul. 9, 1992, now abandoned.

(30) Foreign Application Priority Data

Jul. 12, 1991 (IT) .......................................... MI91A1935

(51) Int. Cl.⁷ ............................. B01J 31/04; B01J 31/00
(52) U.S. Cl. ...................... 502/133; 502/104; 502/113; 502/117; 502/134
(58) Field of Search ................................ 502/104, 113, 502/117, 133, 134

(56) References Cited

U.S. PATENT DOCUMENTS

| | | |
|---|---|---|
| 3,642,746 A | 2/1972 | Kashiwa et al. |
| 3,901,863 A | 8/1975 | Berger et al. |
| 4,292,200 A | 9/1981 | Berger et al. |
| 4,421,674 A | 12/1983 | Invernizzi et al. |
| 4,540,756 A | 9/1985 | Johnson |
| 4,617,360 A | * 10/1986 | Bienfait ..................... 526/124 |
| 4,843,049 A | 6/1989 | Invernizzi et al. |

FOREIGN PATENT DOCUMENTS

| | | |
|---|---|---|
| EP | 243327 | 4/1987 |
| EP | 0322938 | 7/1989 |
| JP | 61-223003 | * 10/1986 |

OTHER PUBLICATIONS

Plasdoc—Central Patents Index—Basic Abstracts Journal, No. 88–047298/07, vol. 88, No. 7, Apr. 13, 1988 (London).

* cited by examiner

*Primary Examiner*—Ling-Siu Choi
(74) *Attorney, Agent, or Firm*—Kramer, Levin, Naftalis & Frankel LLP

(57) ABSTRACT

A solid component of catalyst for the (co)polymerization of ethylene and α-olefins contains magnesium-carboxylate bonds and transition metal-carboxylate and can be represented by the formula:

$$M_1Mg_{(0.3-20)}X_{(2-60)}Al_{(0-6)}(R-COO)_{(0.1-3)} \quad (I)$$

wherein:
- M is at least one metal selected from titanium, vanadium, zirconium and hafnium,
- X is a halogen excluding iodine, and
- R is an aliphatic, cycloaliphatic or aromatic hydrocarbon radical, containing at least 4 carbon atoms.

A description follows of the preparation of a solid component of catalyst (I) and its use in procedures for the (co)polymerization of ethylene and α-olefins.

6 Claims, No Drawings

SOLID COMPONENT OF CATALYST FOR THE (CO) POLYMERIZATION OF ETHYLENE AND α-OLEFINS

This is a continuation, of application Ser. No. 07/912, 232, filed Jul. 9, 1992, now abandoned entitled SOLID COMPONENT OF CATALYST FOR THE (CO) POLYMERIZATION OF EHTYLENE AND ALPHA-OLEFINS.

The present invention relates to a solid component of catalyst, the procedure for its preparation and its use in procedures for the (co)polymerization of ethylene and α-olefins.

It is well-known that ethylene, or α-olefins in general, can be polymerized by means of a procedure at low pressure on Ziegler-Natta catalysts. These catalysts are generally composed of a compound of elements from sub-group IV to VI of the periodic table (compounds of transition metals), mixed with an organometallic compound, or hydride, of the elements belonging to group I to III of the periodic table.

Solid components of Ziegler-Natta catalysts are also known, containing a transition metal (generally titanium), a bivalent metal (generally magnesium), a halogen (generally chlorine) and also possibly an electron donor. These solid components, used in combination with an organometallic compound of aluminium, form active catalysts for the (co) polymerization of ethylene in procedures carried out at low temperature and pressure. U.S. Pat. No. 3,642,746, for example, describes a solid component of catalyst obtained by the contact of a compound of a transition metal with a halide of a bivalent metal treated with an electron donor. According to U.S. Pat. No. 4,421,674 a solid component of catalyst is obtained by the contact of a compound of a transition metal with the product of a solution of magnesium chloride in ethanol which has been spray-dried.

According to U.K. Patent 1.401.708 a solid component of catalyst is obtained by the interaction of a magnesium halide, a non-halogenated compound of a transition metal and an aluminium halide. U.S. Pat. Nos. 3,901,863 and 4,292,200 describe solid components of catalyst obtained by putting a non-halogenated compound of magnesium in contact with a non-halogenated compound of a transition metal and an aluminium halide.

U.S. Pat. No. 4,843,049 and European Patent Application publication 243.327 describe solid components of catalyst which contain titanium, magnesium, aluminium, chlorine and alkoxy groups, highly active in procedures for the (co)polymerization of ethylene carried out at low pressure and temperature, using the technique of suspension, and at high pressure and temperature respectively, in vessels or tubular reactors. These solid components are generally obtained by spray-drying an ethanol solution of magnesium chloride to obtain an active support, which is subsequently reacted with a titanium tetraalkoxide or with titanium tetrachloride and an alkyl aluminium chloride respectively.

It has now been found, according to the present invention, that by introducing magnesium-carboxylate bonds and a transition metal-carboxylate, generally improved solid components of catalyst are obtained, compared to those of the known art, with respect to their highly developed activity in procedures for the (co)polymerization of ethylene and α-olefins carried out at low pressure and temperature, at high pressure and temperature and in solution and also to the nature of the polymers thus obtained.

In accordance with this, the first aspect of the present invention relates to a solid component of catalyst for the (co)polymerization of ethylene and α-olefins which contains magnesium-carboxylate bonds and a transition metal-carboxylate and which can be represented by the formula:

$$M_1Mg_{(0.3-20)}X_{(2-60)}Al_{(0-6)}(R\text{---}COO)_{(0.1-3)} \quad (I)$$

wherein:
M is at least one metal selected from titanium, vanadium, zirconium and hafnium,
X is a halogen excluding iodine, and
R is an aliphatic, cycloaliphatic or aromatic hydrocarbon radical, containing at least 4 carbon atoms.

According to one embodiment, the metal M in formula (I), represents titanium, or titanium and another metal selected from zirconium and hafnium in an atomic ratio between titanium and the other metal of 0.25:1 to 2.0:1 and preferably 0.33:1 to 1:1.

In another preferred embodiment, the halogen X, in formula (I), represents chlorine or bromine and in the more preferred form chlorine.

The maximum number of carbon atoms of the radical R, in formula (I) is not particularly critical, however it is generally not advisable to exceed a value of 25.

Another aspect of the present invention relates to a procedure for the preparation of the solid component of catalyst (I) which includes:

(i) the formation of a solution, in an inert organic solvent, of a magnesium carboxylate or halide of magnesium carboxylate:

$$MgX_n(R\text{---}COO)_{(2-n)} \quad (II)$$

and at least one transition metal carboxylate or halide of at least one transition metal carboxylate:

$$MX_m(R\text{---}COO)_{(4-m)} \quad (III)$$

wherein:
M is at least a metal selected from titanium, vanadium, zirconium and hafnium,
X is a halogen excluding iodine,
R is an aliphatic, cycloaliphatic or aromatic hydrocarbon radical, containing at least 4 carbon atoms, up to about 25 carbon atoms,
n varies from 0 to 1, and
m varies from 0 to 2, and wherein the atomic ratio between the magnesium in (II) and the transition metal (M) in (III) is within the range of 0.3:1 to 20:1;

(ii) the addition to the solution of step (i) of an alkyl aluminium halide having the formula:

$$AlR'_pX_{(3-p)} \quad (IV)$$

wherein:
R' is a linear or branched alkyl radical, containing from 1 to 20 carbon atoms, and
X is a halogen atom excluding iodine, and wherein the ratio between the halogen atoms in (IV) and the total carboxy groups in (II) and (III) varies from 0.3:1 to 10:1, to precipitate the solid component of catalyst (I) into a solid granular form, and (iii) the recovery of the solid component of catalyst from the reaction products of step (ii).

The solvent used to prepare the solution in step (i) of the procedure, may be any inert (not reactive) organic solvent towards the other constituents. Preferred solvents for the purpose are aliphatic, cycloaliphatic or aromatic hydrocarbon solvents, liquid in the operating conditions, such as hexane, heptane, octane, nonane, decane, undecane, dodecane, cyclopentane, cyclohexane, benzene, toluene, xylenes and mesithylenes.

Examples of R—COO carboxylic groups, in formulae (II) and (III), are those wherein:

the radical R is a linear alkyl containing at least 9 carbon atoms; for example n-decanoate, n-undecanoate and n-dodecanoate groups;

the radical R is a branched alkyl product having a branching on the secondary carbon atom in α with respect to the carboxyl carbon:

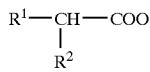

wherein the sum of carbon atoms in $R^1$ and $R^2$ is equal to at least 2; for example isobutyrate groups, 2-methylbutyrate groups and 2-ethylhexanoate groups;

the radical R is a branched alkyl having two branchings on the tertiary carbon atom in α with respect to the carboxyl carbon

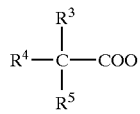

wherein the sum of the carbon atoms in $R^3$, $R^4$ and $R^5$ is equal to at least 3; for example 2,2-dimethyl propanoate and versatate groups;

the radical R is an alkyl having a branching on the secondary carbon atom in β position with respect to the carboxyl carbon atom:

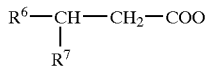

wherein the sum of the carbon atoms in $R^6$ and $R^7$ is equal to at least 4; for example 3-ethyl pentanoate and citronellate groups;

the radical R is a cycloalkyl, cycloaryl, alkylene cycloalkyl or alkylene cycloaryl:

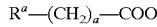

wherein $R^8$ represents the cycloalkyl or cycloaryl portion, either monocyclic or with several condensed or uncondensed cycles, and s varies from 0 to 10; for example the naphthenate group;

the radical R is an alkyl substituted with aryl in position α with respect to the carboxyl carbon atom:

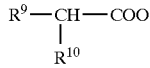

wherein $R^9$ is an aryl, for example a phenyl and $R^{10}$ is an alkyl containing at least 1 carbon atom; for example the 2-phenylbutyrate group.

In accordance with one embodiment, the metal M, in formula (III), represents titanium, or titanium and another metal selected from zirconium and hafnium, with an atomic ratio between the titanium and the other metal of 0.25:1 to 2.0:1 and preferably 0.33:1 to 1:1.

In another preferred embodiment, X, in formulae (II) and (III), represents chlorine or bromine and in the preferred form chlorine.

In accordance with a further embodiment, n in formula (II) has a value of at least 0.1 and preferably at least 0.5 to 1, and m in the formula (III) has a value of at least 0.1 and preferably at least 0.2 to 2.

It is convenient in step (i) to mix a solution of compound (II) in the selected solvent, with a solution of compound (III) in the same solvent, or in a different solvent, operating at room temperature (20–25° C.) or at temperatures close thereto. The solutions of compounds (II) and (III) in the relative solvents can be obtained with a simple and practical procedure, which will be described hereinbelow and illustrated in the examples.

In step (ii) of the procedure, an aluminium halide (IV) is added to and reacted with the solution prepared in step (i). Preferred aluminium halides are alkyl aluminium chlorides and bromides, wherein the alkyl contains from 1 to 6 carbon atoms. Aluminium halides which are even more preferred are ethyl aluminium dichloride, diethyl aluminium chloride, ethyl aluminium sesquichloride, isobutyl aluminium dichloride, diethyl aluminium bromide and ethyl aluminium dibromide. The aluminium halide may be added as such, or in the form of a solution in an inert organic solvent selected from those used for the preparation of the solution of step (i).

In step (ii) it is convenient to operate at a temperature ranging from 20 to 120° C. for a period which, depending on the temperature selected, may vary from 0.5 to 8 hours. In the preferred method, the aluminium halide is added to the solution of compounds (II) and (III), at room temperature (20–25° C.), or at a temperature close thereto and the mixture obtained is heated to a temperature ranging from 50 to 100° C., for a period of 45 to 180 minutes.

Operating under these conditions, the solid component of catalyst (I) is obtained in the form of a powder precipitate, with a particle size of 10 μm to 40 μm. When M represents titanium, catalysts (I) are obtained wherein the ratio between titanium in its trivalent state and the sum of titanium in its trivalent and tetravalent state generally varies from 0.9:1 to 1:1.

The solid component of catalyst thus obtained is separated from the suspension in step (iii) using normal methods such as decantation, filtration or centrifugation, washed with a hydrocarbon solvent and possibly dried.

As specified before, compounds (II) and (III) can be prepared directly in solution using a simple and practical method. More specifically, compounds (II) can be obtained by the reaction of a R—COOH carboxylic acid (wherein R corresponds to the above definition) with a magnesium halide $MgX_2$ (wherein X has the above definition), in accordance with the following reaction:

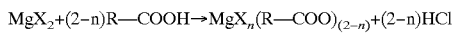

Similarly compounds (III) can be obtained by the reaction of a R—COOH carboxylic acid (wherein R has the above definition) with a halide of a metal M ($MX_4$, wherein X has the above definition), in accordance with the reaction:

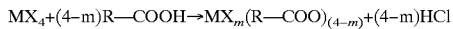

Examples of suitable R—COOH acids are n-decanoic, n-undecanoic, n-dodecanoic, 2-ethylhexanoic, versatic, citronellic, naphthenic and 2-phenyl-butyric acids.

The magnesium halide used for the purpose may be:

a highly crystalline magnesium halide, with a particle size preferably not higher than 100 μm and with a water content preferably lower than 0.2% by weight; or a partially or completely amorphous magnesium halide, such as that which can be obtained by the prolonged grinding of a crystalline magnesium halide or by the spray-drying of aqueous solutions or solutions in an organic solvent of a magnesium halide.

Among all magnesium halides, it is preferable to use amorphous magnesium chloride obtained by the spray-drying of ethanol solutions of the chloride, as described for example in U.S. Pat. No. 4,843,049.

The reaction between magnesium halide or the halide of metal M and R—COOH acid is conveniently carried out in an inert organic solvent and preferably an aliphatic, cycloaliphatic or aromatic solvent, by eliminating the hydrologenic acid which develops as a reaction by-product, for example by bubbling a flow of an inert gas such as nitrogen. At the end of the reaction, a solution of magnesium halide carboxylate or metal M halide carboxylate is obtained in a dissolved form in the solvent used as reaction medium. The solvent will obviously be selected so as to have the maximum solubility of the reagents and reaction products. Paraffinic solvents will therefore be preferred when aliphatic R—COOH acids are used and aromatic, solvents when aromatic or substantially aromatic R—COOH acids are used. The use of mixed solvents is obviously not excluded. Whatever the case, any possible undissolved material may be separated by filtration or decanting. In the preparation of compound (II) it is convenient to operate with concentrations of $MgX_2$ of 0.1 to 0.7M, in that with higher concentration values a decrease is observed in the yield of the desired compound (II). On the other hand, the concentration of compounds $MX_4$ in the preparation of compound (III) is not particularly critical. If there is an excess of R—COOH acid in the mixture at the end of the reaction, it is not necessary to separate this, provided that the free carboxylic groups do not exceed 100% of the solified total carboxylic groups. If this is the case in step (ii) of the procedure for the preparation of the solid component of catalyst, the total carboxylic groups will be those deriving from (II) and (III) and those deriving from free R—COOH acid.

When a magnesium chloride spray-dried from an alcohol solution, particularly an ethanol solution, is used in step (i), the solid component of catalyst (I) will additionally contain alkoxy groups, and in particular ethoxy groups, in quantities, however, not higher than 25% with respect to the total carboxy groups.

In a preferred embodiment, the solution used in step (i) of the procedure for the preparation of the solid component of catalyst is obtained by the reaction of a solution containing both $MgX_2$ and $MX_4$, with the required quantity of R—COOH acid. However, a separate reaction, as described above, is generally preferred, in that it is a more versatile method of obtaining components of catalyst with different formulations.

A further aspect of the present invention relates to catalysts for the (co)polymerization of ethylene and α-olefins, formed from the solid component of catalyst described above, combined with an organo-metallic compound of aluminium (co-catalyst) which can be selected from aluminium trialkyls and the halides (such as chlorides) of aluminium alkyl, containing 1 to 6 carbon atoms in the alkyl portion. Among these, aluminium trialkyls are preferred, such as aluminium triethyl, aluminium tri-n-butyl, aluminium triisobutyl and aluminium trihexyl. In the catalysts of the present invention the atomic ratio between the aluminium (in the co-catalyst) and the titanium (in the solid component of catalyst) generally varies from 3:1 to 1,500:1 and preferably from 5:1 to 200:1, in relation to the particular polymerization system used and its purity.

The present invention also relates to procedures for the polymerization and copolymerization of ethylene and α-olefins which use the above catalyst. The α-olefins are generally those containing from 3 to 15 carbon atoms, such as propylene, butene-1, 4-methylpentene-1, hexene-1 and octene-1.

In particular, the catalyst of the present invention may be used in the preparation of polyethylenes with a narrow molecular weight distribution, which have the desired combination of characteristics as regards Melt-Index, Shear Sensitivity and ratio between weight average molecular weight (Mw) and number average molecular weight (Mn). In this case, it is convenient to operate using the technique of a suspension in an inert diluent under the following general conditions: temperature 60 to 95° C., pressure 6 to 20 kg/cm² and ratio between the partial pressures of hydrogen and ethylene of 0 to 5. In the homopolymerization of ethylene and copolymerization of ethylene with propylene, butene-1 or hexene-1, to obtain polyethylenes with a narrow molecular weight distribution (Mw/Mn from 3 to 6), it is preferably to use solid components of catalyst with a lower content of magnesium and halogen, wherein M is titanium (IA):

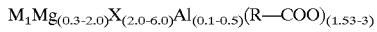

$M_1Mg_{(0.3-2.0)}X_{(2.0-6.0)}Al_{(0.1-0.5)}(R—COO)_{(1.53-3)}$

These solid components of catalyst may be obtained by operating under the general conditions of the above procedure and using in step (i) an atomic ratio between magnesium and transition metal tending towards the lower limits, such as for example 0.3:1 to 2.0:1 and a ratio between the halogen atoms and carboxy groups in step (ii) towards low limits such as 0.3:1 to 1.5:1.

The solid component (IA) is also suitable for the copolymerization of ethylene with α-olefins, especially propylene, giving copolymers with elastomeric characteristics. In this case, it is convenient to use the method in suspension or solution, at a temperature of 20 to 60° C. and a pressure of 4 to 25 kg/cm².

When it is necessary to produce a (co)polymer of ethylene with a wide distribution of molecular weight in a two-step procedure in suspension, it is advantageous to use solid components of catalyst with an average content of magnesium and halogen, wherein M is preferably titanium (IB):

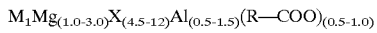

$M_1Mg_{(1.0-3.0)}X_{(4.5-12)}Al_{(0.5-1.5)}(R—COO)_{(0.5-1.0)}$

These solid components of catalyst may be obtained by operating under the general conditions of the above procedure and using in step (i) an atomic ratio between magnesium and transition metal of 1.0:1 to 3.0:1 and a ratio between the halogen atoms and carboxy groups in step (ii) towards the lower limits such as 1.2:1 to 4.0:1. In this case, it is convenient to operate at temperatures of 70 to 90° C. for the first step, with total pressures of 8 to 12 kg/cm² and at temperatures of 70 to 90° C. for the second step, with total pressures of 4 to 8 kg/cm² and with a ratio between the partial pressures of hydrogen and ethylene of 0.15 to 4.5.

For the production of an ethylene polymer with a wide distribution of molecular weights in a one step procedure in suspension, it is advantageous to use a solid component of catalyst wherein M represents two transition metals and preferably titanium and zirconium or hafnium with an atomic ratio Ti:Zr or Ti:Hf of 0.33:1 to 1:1 (IC):

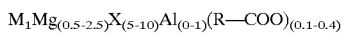

$M_1Mg_{(0.5-2.5)}X_{(5-10)}Al_{(0-1)}(R—COO)_{(0.1-0.4)}$

This bimetallic catalyst can be easily obtained by using, in step (i) of the procedure a solution of titanium chloride carboxylate and a solution of zirconium or hafnium chloride carboxylate. The polymerization is conveniently carried out in one step, using the suspension method, at a temperature of 70 to 95° C., at a pressure of 6 to 15 kg/cm² and with a ratio between the partial pressures of hydrogen and ethylene of 0 to 5. The molecular weight distribution of the polyethylenes obtained with the one step procedure can be controlled by varying the composition of the bimetallic component of catalyst, within the above limits, and/or by introducing a Lewis base, as described in Italian Patent Application 22.115 A/88, of Sep. 29th 1988 in the name of the Applicant.

The solid component of catalyst of the present invention is also highly active in procedures for the copolymerization of ethylene with α-olefins, carried out at a high temperature and pressure, in vessel or tubular reactors, to obtain LLDPE (density from 0.935 to 0.915 g/ml), and VLLDPE (density from 0.915 to 0.900 g/ml) and ULDPE (density from 0.900 to 0.87). In these procedures it is customary to operate at temperatures of 90° C. to 280° C., at pressures of 800 to 2,000 kg/cm² and for 15 to 90 seconds in the case of tubular reactors and at temperatures of 140 to 280° C., with times of 45 to 180 seconds and at pressures similar to those specified above, in the case of vessel reactors. In these polymerizations, it is preferable to use solid components of catalyst with a higher content of magnesium and halogen, wherein M is preferably titanium or titanium and hafnium. When M is titanium the solid component of catalyst can be defined with the formula (ID):

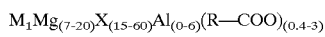

When M is titanium and hafnium, in an atomic ratio of 0.33:1 to 1:1, the formula for the preferred catalyst is (IE):

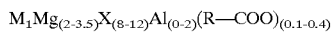

It has been found that the solid components of catalyst (ID) and (IE) are active in catalysts wherein the atomic ratio between the aluminium (in the co-catalyst) and the titanium (in the solid component of catalyst) is unusually low and in particular within the range of 3 to 10 and are capable of producing copolymers of ethylene with butene-1 and with propylene having a high molecular weight (not sticky) and density values as low as 0.870 g/ml.

Finally, the solid component of catalyst of the present invention is highly active in procedures for the homopolymerization of α-olefins such as propylene, butene-1, 4-methyl-1-pentene, hexene-1 and octene-1, to obtain poly(α-olefins) with a high productivity and high molecular weight, in relation to the composition of the component itself. In particular, in order to produce poly(α-olefins) with a high productivity, it is advantageous to use solid components of catalyst with a high content of magnesium wherein M is titanium (IF):

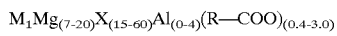

To produce poly(α-olefins) with a high molecular weight (ultra high molecular weight) in the above formula (IF) M will represent hafnium or zirconium. In both cases the polymerization will be carried out in suspension, at temperatures ranging from 20 to 90° C.

The following reference examples and examples for the preparation of catalyst and for polymerization provide a better illustration of the present invention. In reference examples 1 to 19, a magnesium chloride is used, which is obtained by spray-drying an ethanol solution of magnesium chloride, in the form of spherical particles, of which about 90% have a size of 0.5 to 10 μm, with an apparent density of 0.4 g/ml, surface area of 3 m²/g, porosity of 0.7 ml/g and content of hydroxy groups from alcohols of 10% by weight (expressed as weight of ethanol). This magnesium chloride was obtained in accordance with Example 1 of U.S. Pat. No. 4,843,049.

REFERENCE EXAMPLE 1

Preparation of Magnesium Chloride Versatate 10.7 g (100 mmoles) of the support obtained as described above, are suspended in 250 ml of n-decane, operating in a 1,000 ml stirred reactor. The suspension is heated to 100° C. and 35 g (38.5 ml, 200 mmoles) of versatic acid (average molecular weight 175, d=0.91 g/ml, with a molar ratio versatic acid/MgCl₂ equal to 2.0) are slowly added, under stirring. At the end of the addition, nitrogen is bubbled into the suspension for 5 hours, the temperature being kept at 100° C., to facilitate the removal of the hydrochloric acid which has formed. After this period, the suspension is cooled to room temperature (20–25° C.) and the residue is filtered on a sintered glass septum.

The soluble product in the filtrate shows the following chemical analysis: Mg=384 moles/l, Cl=466 mmoles/l, with an atomic ratio Cl/Mg of 1.2.

The yield in magnesium chloride versatate is equal to 90% with respect to the total MgCl₂ charged.

REFERENCE EXAMPLE 2

Preparation of Magnesium Chloride Versatate

The same procedure is used as described in reference example 1, charging into the reactor:

10.7 g (100 mmoles) of support, 250 ml of n-decane 43.75 g (250 mmoles) of versatic acid (48.07 ml, average molecular weight 175, d=0.91 g/ml).

The molar ratio versatic acid/MgCl₂ is therefore equal to 2.5.

The soluble product in the filtrate shows the following analysis: Mg=551.1 moles/l, Cl=674.8 moles/l, with an atomic ratio Cl/Mg of 1.2.

The yield in magnesium chloride versatate is equal to 95% with respect to the total amount of MgCl₂ charged.

REFERENCE EXAMPLE 3

Preparation of Magnesium Chloride Versatate

The same procedure is used as described in reference example 1, charging into the reactor:

10.7 g (100 mmoles) of support, 300 ml of n-decane 52.5 g (300 mmoles) of versatic acid (57.7 ml, average molecular weight 175, d=0.91 g/ml).

The molar ratio versatic acid/MgCl₂ is therefore equal to 3.0.

The soluble product in the filtrate shows the following analysis: Mg=360 moles/l, Cl=455 moles/l, with an atomic ratio Cl/Mg of 1.26.

The yield in magnesium chloride versatate is equal to 100% with respect to the total amount of MgCl₂ charged.

REFERENCE EXAMPLE 4

Preparation of Magnesium Chloride Versatate

The same procedure is used as described in reference example 1, charging into the reactor:

10.7 g (100 mmoles) of support, 350 ml of n-decane 70 g (400 mmoles) of versatic acid (76.92 ml, average molecular weight 175, d=0.91 g/ml).

The molar ratio versatic acid/$MgCl_2$ is therefore equal to 4.0.

The soluble product in the filtrate shows the following analysis: Mg=380.7 moles/l, Cl=464 moles/l, with an atomic ratio Cl/Mg of 1.2.

The yield in magnesium chloride versatate is equal to 100% with respect to the total amount of $MgCl_2$ charged.

REFERENCE EXAMPLE 5

Preparation of Magnesium Chloride Citronellate

The same procedure is used as described in reference example 1, charging into the reactor:

10.7 g (100 mmoles) of support, 250 ml of n-decane 34.06 g (200 mmoles) of citronellic acid (37.02 ml, average molecular weight 170.3, d=0.92 g/ml).

The molar ratio citronellic acid/$MgCl_2$ is therefore equal to 2.0.

The soluble product in the filtrate shows the following analysis: Mg=300.6 moles/l, Cl=349.75 moles/l, with an atomic ratio Cl/Mg of 1.1.

The yield in magnesium chloride citronellate is equal to 96% with respect to the total amount of $MgCl_2$ charged.

REFERENCE EXAMPLE 6

Preparation of Magnesium Chloride Citronellate

The same procedure is used as described in reference example 1, charging into the reactor:

10.7 g (100 mmoles) of support, 300 ml of n-decane 51.09 g (300 mmoles) of citronellic acid (55.5 ml, average molecular weight 170.3, d=0.92 g/ml).

The molar ratio citronellic acid/$MgCl_2$ is therefore equal to 3.0.

The soluble product in the filtrate shows the following analysis: Mg=320.6 moles/l, Cl=396.1 moles/l, with an atomic ratio Cl/Mg of 1.2.

The yield in magnesium chloride citronellate is equal to 100% with respect to the total amount of $MgCl_2$ charged.

REFERENCE EXAMPLE 7

Preparation of Magnesium Chloride (2-Ethylhexanoate)

The same procedure is used as described in reference example 1, charging into the reactor:

10.7 g (100 mmoles) of support, 250 ml of n-decane 28.8 g (200 mmoles) of 2-ethylhexanoic acid (31.8 ml, average molecular weight 144.22, d=0.906 g/ml).

The molar ratio 2-ethylhexanoic acid/$MgCl_2$ is therefore equal to 2.0.

The soluble product in the filtrate shows the following analysis: Mg=330.66 mmoles/l, Cl=343.1 mmoles/l, with an atomic ratio Cl/Mg of 1.03.

The yield in magnesium chloride 2-ethylhexanoate is equal to 92% with respect to the total amount of $MgCl_2$ charged.

REFERENCE EXAMPLE 8

Preparation of Magnesium Chloride (2-Ethylhexanoate)

The same procedure is used as described in reference example 1, charging into the reactor:

10.7 g (100 mmoles) of support, 300 ml of n-decane 43.26 g (300 mmoles) of 2-ethylhexanoic acid (47.7 ml, average molecular weight 144.22, d=0.906 g/ml).

The molar ratio 2-ethylhexanoic acid/$MgCl_2$ is therefore equal to 3.0.

The soluble product in the filtrate shows the following analysis: Mg=340.7 mmoles/l, Cl=333.2 mmoles/l, with an atomic ratio Cl/Mg of 0.97.

The yield in magnesium chloride 2-ethylhexanoate is equal to 100% with respect to the total amount of $MgCl_2$ charged.

REFERENCE EXAMPLE 9

Preparation of Magnesium Chloride Naphthenate

The same procedure is used as described in reference example 1, charging into the reactor:

10.7 g (100 mmoles) of support, 350 ml of n-decane 52.8 g (200 mmoles) of naphthenic acid (54.48 ml, average molecular weight 264.22, d=0.97 g/ml).

The molar ratio 2-ethylhexanoic acid/$MgCl_2$ is therefore equal to 2.0.

The soluble product in the filtrate shows the following analysis: Mg=350 mmoles/l, Cl=360.3 mmoles/l, with an atomic ratio: Cl/Mg of 1.02.

The yield in magnesium chloride naphthenate is equal to 95% with respect to the total amount of $MgCl_2$ charged.

REFERENCE EXAMPLE 10

Preparation of Magnesium Chloride Naphthenate

The same procedure is used as described in reference example 1, charging into the reactor:

10.7 g (100 mmoles) of support, 300 ml of n-decane 79.26 g (300 mmoles) of naphthenic acid (81.72 ml, average molecular weight 264.22, d=0.97 g/ml).

The molar ratio naphthenic acid/$MgCl_2$ is therefore equal to 3.0.

The soluble product in the filtrate shows the following analysis: Mg=310.6 mmoles/l, Cl=306.6 mmoles/l, with an atomic ratio Cl/Mg of 1.0.

The yield in magnesium chloride naphthenate is equal to 100% with respect to the total amount of $MgCl_2$ charged.

REFERENCE EXAMPLE 11

Preparation of Magnesium Chloride 2-Phenylbutyrate 5.52 g (51.6 mmoles) of the support obtained as already described, are suspended in 300 ml of toluene, operating in a stirred 1,000 ml reactor. 16.9 g (103.2 mmoles) of 2-phenylbutyric acid dissolved in 150 ml of anhydrous toluene (with a molar ratio phenylbutyric acid/MgCl$_2$ equal to 2.0) are slowly added, under stirring, to the suspension obtained, kept at room temperature. At the end of the addition, nitrogen is bubbled in for 3 hours. The residue is filtered on a sintered glass septum.

The soluble product in the filtrate shows the following chemical analysis: Mg=808 moles/l, Cl=992 mmoles/l, with an atomic ratio Cl/Mg of 1.2.

The yield in magnesium chloride 2-phenylbutyrate is 90.5% with respect to the total MgCl$_2$ charged.

REFERENCE EXAMPLE 12

Preparation of Titanium Chloride Versatate 5.69 g (30 mmoles, 3.3 ml, density 1.726 g/ml) of titanium tetrachloride (TiCl$_4$) are dissolved in 200 ml of n-decane in a stirred 500 ml reactor. 10.5 g (11.5 ml, 60 mmoles) of versatic acid (average molecular weight 175, d=0.91 g/ml, with a molar ratio versatic acid/MgCl$_2$ of 2.0) are slowly added, under stirring, to the solution, heated to 80° C. At the end of the addition nitrogen is bubbled into the solution, kept at 100° C., for 5 hours, to facilitate the removal of hydrochloric acid which has formed. After this period, the solution is cooled to room temperature (20–25° C.) and a solution is obtained which shows the following analysis: Ti=146.1 mmoles/l, Cl=226 mmoles/l, with an atomic ratio Cl/Ti of 1.56.

REFERENCE EXAMPLE 13

Preparation of Titanium Chloride Citronellate

The same procedure is used as described in reference example 12, charging into the reactor:
- 5.69 g (30 mmoles, 3.3 ml, density 1.1726 g/ml) of titanium tetrachloride,
- 200 ml of n-decane,
- 10.2 g (60 mmoles) of citronellic acid (11.1 ml, molecular weight 170.3, d=0.922 g/ml).

The molar ratio citronellic acid/Ti is therefore equal to 2.0.

The solution obtained shows the following analysis: Ti=153.64 mmoles/l, Cl=248.2 mmoles/l, with an atomic ratio Cl/Ti of 1.61.

REFERENCE EXAMPLE 14

Preparation of Titanium Chloride (2-Ethylhexanoate)

The same procedure is used as described in reference example 12, charging into the reactor:
- 5.69 g (30 mmoles, 3.3 ml, density 1.1726 g/ml) of titanium tetrachloride,
- 200 ml of n-decane,
- 8.6 g (60 mmoles) of 2-ethylhexanoic acid (9.6 ml, molecular weight 144.22, d=0.906 g/ml).

The molar ratio 2-ethylhexanoic acid/Ti is therefore equal to 2.0.

The solution obtained shows the following analysis: Ti=239.0 mmoles/l, Cl=392.6 mmoles/l, with an atomic ratio Cl/Ti of 1.64.

REFERENCE EXAMPLE 15

Preparation of Titanium Chloride Naphthenate

The same procedure is used as described in reference example 12, charging into the reactor:
- 5.69 g (30 mmoles, 3.3 ml, density 1.726 g/ml) of titanium tetrachloride,
- 200 ml of n-decane,
- 15.8 g (60 mmoles) of naphthenic acid (16.3 ml, molecular weight 264.22, d=0.97 g/ml).

The molar ratio naphthenic acid/Ti is therefore equal to 2.0.

The solution obtained shows the following analysis: Ti=223.3 mmoles/l, Cl=432.2 mmoles/l, with an atomic ratio Cl/Ti of 1.9.

REFERENCE EXAMPLE 16

Preparation of Vanadium Chloride Versatate

The same procedure is used as described in reference example 12, charging into the reactor:
- 3.86 g (20 mmoles, 2.12 ml, density 1.816 g/ml) of vanadium tetrachloride,
- 200 ml of n-decane,
- 7 g (40 mmoles, 7.7 ml) of versatic acid (average molecular weight 175, density 0.91 g/ml).

The molar ratio versatic acid/V is therefore equal to 2.0.

The solution obtained shows the following analysis: V=68.5 mmoles/l, Cl=116.4 mmoles/l, with an atomic ratio Cl/V of 1.7.

REFERENCE EXAMPLE 17

Preparation of Hafnium Chloride Versatate 8.34 g (26 mmoles) of hafnium tetrachloride (HfCl$_4$) are suspended in 250 ml of n-decane in a stirred 500 ml reactor. 9.1 g (10 ml, 52 mmoles) of versatic acid (average molecular weight 175, d=0.91 g/ml, with a molar ratio versatic acid/HfCl$_4$ of 2.0) are slowly added, under stirring, to the suspension, kept at room temperature. At the end of the addition, the suspension is heated to 100° C. and nitrogen it bubbled in for 3 hours to facilitate the removal of hydrochloric acid. After this period, the suspension is filtered while hot and a solution is obtained, which shows the following analysis: Hf=103.1 mmoles/l, Cl=214.4 mmoles/l, with an atomic ratio Cl/Hf of 2. The yield in hafnium in the solution is 85.3% with respect to the initial amount.

REFERENCE EXAMPLE 18

Preparation of Zirconium Chloride Versatate

The same procedure is used as described in reference example 17, charging into the reactor:
- 8.49 g (36.4 mmoles) of zirconium tetrachloride,
- 200 ml of n-decane,
- 12.7 g (72.8 mmoles, 14.0 ml) of versatic acid (average molecular weight 175, density 0.91 g/ml).

The molar ratio versatic acid/Zr is therefore equal to 2.0.

The solution obtained shows the following analysis: Zr=81.3 mmoles/l, Cl=126.8 mmoles/l, with an atomic ratio Cl/Zr of 1.56.

The yield of zirconium in solution is equal to 87.7% with respect to the initial zirconium.

REFERENCE EXAMPLE 19

Preparation of Hafnium Chloride 2-Phenylbutyrate 16.4 g (51.1 mmoles) of hafnium tetrachloride ($HfCl_4$) are suspended in 200 ml of toluene in a stirred 500 ml reactor. 16.8 g (102.2 mmoles) of 2-phenylbutyric acid dissolved in 100 ml of toluene, with a molar ratio 2-phenylbutyric acid/$HfCl_4$ of 2.0, are added, under stirring, to the suspension, kept at room temperature. At the end of the addition, nitrogen is bubbled in for 3 hours, at room temperature, to facilitate the removal of hydrochloric acid. After this period, the suspension is filtered while hot and a solution is obtained which shows the following analysis: Hf=812 mmoles/l, Cl=1476 mmoles/l, with an atomic ratio Cl/Hf of 1.8. The yield in hafnium in solution is equal to 95.1% with respect to the initial hafnium.

EXAMPLE 1

Preparation of Catalyst Component $$Ti_1Mg_{16.3}Al_{1.9}Cl_{36.2}RCOO_{0.76}$$

238.1 mmoles (620 ml of solution in n-decane) of magnesium chloride versatate prepared as described in reference example 1 (atomic ratio Cl/Mg=1.2) and subsequently 14.9 mmoles (102 ml of solution in n-decane) of titanium chloride versatate prepared as described in reference example 12 (atomic ratio Cl/Ti=1.56) are charged into a stirred 2,000 ml reactor.

At an operating temperature of 30° C., 139.5 g (565.5 mmoles) of ethyl aluminium sesquichloride (ratio between the chlorine atoms in the ethyl aluminium sesquichloride and the alkoxydic and carboxylic groups equal to 3/1), diluted with n-decane to 440 ml, are slowly added dropwise. At the end of the addition, the suspension is heated to 90° C. for 2 hours and the solid content is then filtered on a porous septum of sintered glass.

27.5 g of a solid component of catalyst are thus obtained, which are washed with three portions of 100 ml of n-heptane. The solid component of catalyst shows the following characteristics:

titanium content: 2.5% by weight;
magnesium content: 20.7% by weight;
aluminium content: 2.7% by weight;
chlorine content: 67.2% by weight;
content of organic fraction: 6.9% by weight (the organic fraction is basically composed of residues of versatic acid);
ratio between titanium in its trivalent state and the sum of titanium in its trivalent and tetravalent state: 0.98;
surface area: 40 m$_2$/g;
porosity: 70 volumes %.

Expressing the components in relation to their atomic proportions, the solid component of catalyst may be represented by the formula:

$$Ti_1Mg_{16.3}Al_{1.9}Cl_{36.2}RCOO_{0.76}$$

EXAMPLE 2

Preparation of Catalyst Component $$Ti_1Mg_{4.1}Al_{0.36}Cl_{12.2}RCOO_{0.27}$$

160 mmoles (250 ml of solution in n-decane) of magnesium chloride versatate prepared as described in reference example 1 and subsequently 40 mmoles (286 ml of solution in n-decane) of titanium chloride versatate prepared as described in reference example 12 are charged into a stirred 2,000 ml reactor.

At an operating temperature of 30° C., 108.9 g (440 mmoles) of ethyl aluminium sesquichloride (ratio between the chlorine atoms in the ethyl aluminium sesquichloride and the alkoxydic and carboxylic groups equal to 3/1), diluted with n-decane to 345 ml, are slowly added dropwise. At the end of the addition, the suspension is heated to 90° C. for 2 hours and the solid content is then filtered on a porous septum of sintered glass.

24.5 g of a solid component of catalyst are thus obtained, which are washed with three portions of 100 ml of n-heptane. The solid component of catalyst shows the following characteristics:

titanium content: 7.5% by weight;
magnesium content: 15.6% by weight;
aluminium content: 1.5% by weight;
chlorine content: 68.0% by weight;
content of organic fraction: 7.4% by weight;
ratio between titanium in its trivalent state and the sum of titanium in its trivalent and tetravalent state: 0.98;

Expressing the components in relation to their atomic proportions, the solid component of catalyst may be represented by the formula:

$$Ti_1Mg_{4.1}Al_{0.36}Cl_{12.2}RCOO_{0.27}$$

EXAMPLE 3

Preparation of Catalyst Component $$Ti_1Mg_{7.6}Al_{0.37}Cl_{17.65}RCOO_{0.49}$$

The same procedure is used as in example 1 but for the different amounts of the added components:

160 mmoles (416 ml of solution in n-decane) of magnesium chloride versatate prepared as described in reference example 1;
20 mmoles (144 ml of solution in n-decane) of titanium chloride versatate prepared as described in reference example 12;
98.8 g (400 mmoles) of ethyl aluminium sesquichloride (diluted with n-decane to 313 ml);
ratio between the chlorine atoms in the ethyl aluminium sesquichloride and the alkoxydic and carboxylic groups equal to 3/1.

Analysis:
titanium content: 5.0% by weight;
magnesium content: 18.9% by weight;
aluminium content: 2.4% by weight;
chlorine content: 64.7% by weight;
content of organic fraction: 9.0% by weight;
ratio between titanium in its trivalent state and the sum of titanium in its trivalent and tetravalent state: 0.98;

Formula: $Ti_1Mg_{7.6}Al_{0.87}Cl_{17.65}RCOO_{0.49}$

EXAMPLE 4

Preparation of Catalyst Component $$Ti_1Mg_{10.6}Al_{2.1}Cl_{25.8}RCOO_{0.64}$$

The same procedure is used as in example 1 but for the different amounts of the added components:

100 mmoles (106 ml of hydrocarbon solution) of magnesium chloride versatate prepared as described in reference example 1;

10 mmoles (11.7 ml of solution in n-decane) of titanium chloride versatate prepared as described in reference example 12;

60.5 g (245 mmoles) of ethyl aluminium sesquichloride (diluted with n-decane to 190 ml);

ratio between the chlorine atoms in the ethyl aluminium sesquichloride and the alkoxydic and carboxylic groups equal to 3/1.

Analysis:

titanium content: 3.45% by weight;

magnesium content: 18.5% by weight;

aluminium content: 4.1% by weight;

chlorine content: 65.9% by weight;

content of organic fraction: 8.0% by weight;

ratio between titanium in its trivalent state and the sum of titanium in its trivalent and tetravalent state: 0.99;

Formula: $Ti_1Mg_{10.6}Al_{2.1}Cl_{25.8}RCOO_{0.64}$

EXAMPLE 5

Preparation of Catalyst Component $Ti_1Mg_{16.6}Al_{2.6}Cl_{38.6}RCOO_{1.13}$

The same procedure is used as in example 1 but for the different amounts of the added components:

160 mmoles (170 ml of hydrocarbon solution) of magnesium chloride versatate prepared as described in reference example 1;

10 mmoles (11.7 ml of solution in n-decane) of titanium chloride versatate prepared as described in reference example 12;

78.4 g (316 mmoles) of ethyl aluminium sesquichloride diluted with n-decane to 250 ml;

ratio between the chlorine atoms in the ethyl aluminium sesquichloride and the alkoxydic and carboxylic groups equal to 2.5/1.

Analysis:

titanium content: 2.3% by weight;

magnesium content: 19.3% by weight;

aluminium content: 3.3% by weight;

chlorine content: 65.6% by weight;

content of organic fraction: 9.5% by weight;

ratio between titanium in its trivalent state and the sum of titanium in its trivalent and tetravalent state: 0.97;

Formula: $Ti_1Mg_{16.6}Al_{2.6}Cl_{38.6}RCOO_{1.13}$

EXAMPLE 6

Preparation of Catalyst Component $Ti_1Mg_{16.6}Al_{3.3}Cl_{40}RCOO_{1.1}$

The same procedure is used as in example 1 but for the different amounts of the added components:

160 mmoles (170 ml of hydrocarbon solution) of magnesium chloride versatate prepared as described in reference example 1;

10 mmoles (11.7 ml of solution in n-decane) of titanium chloride versatate prepared as described in reference example 12;

62.7 g (253.3 mmoles) of ethyl aluminium sesquichloride diluted with n-decane to 250 ml;

ratio between the chlorine atoms in the ethyl aluminium sesquichloride and the alkoxydic and carboxylic groups equal to 2/1.

Analysis:

titanium content: 2.2% by weight;

magnesium content: 18.8% by weight;

aluminium content: 4.1% by weight;

chlorine content: 66.1% by weight;

content of organic fraction: 8.8% by weight;

ratio between titanium in its trivalent state and the sum of titanium in its trivalent and tetravalent state: 0.98;

Formula: $Ti_1Mg_{16.6}Al_{3.3}Cl_{40}RCOO_{1.1}$

EXAMPLE 7

Preparation of Catalyst Component $Ti_1Mg_{18}Al_3Cl_{39.3}RCOO_{1.25}$

The same procedure is used as in example 1 but for the different amounts of the added components:

160 mmoles (230 ml of hydrocarbon solution) of magnesium chloride versatate prepared as described in reference example 1;

10 mmoles (11.7 ml of solution in n-decane) of titanium chloride versatate prepared as described in reference example 12;

47 g (190 mmoles) of ethyl aluminium sesquichloride diluted with n-decane to 150 ml;

ratio between the chlorine atoms in the ethyl aluminium sesquichloride and the alkoxydic and carboxylic groups equal to 1.5/1.

Analysis:

titanium content: 2.2% by weight;

magnesium content: 20% by weight;

aluminium content: 3.7% by weight;

chlorine content: 64.8% by weight;

content of organic fraction: 10% by weight;

ratio between titanium in its trivalent state and the sum of titanium in its trivalent and tetravalent state: 0.97;

Formula: $Ti_1Mg_{18}Al_3Cl_{39.3}RCOO_{1.25}$

EXAMPLE 8

Preparation of Catalyst Component $Ti_1Mg_{19}Al_{4.8}Cl_{43}RCOO_{1.25}$

The same procedure is used as in example 1 but for the different amounts of the added components:

160 mmoles (230 ml of hydrocarbon solution) of magnesium chloride versatate prepared as described in reference example 1;

10 mmoles (11.7 ml of solution in n-decane) of titanium chloride versatate prepared as described in reference example 12;

88.4 g (570 mmoles) of isobuthyl aluminium dichloride diluted with n-decane to 260 ml;

ratio between the chlorine atoms in the isobuthyl aluminium dichloride and the alkoxydic and carboxylic groups equal to 3/1.

Analysis:
titanium content: 2% by weight;
magnesium content: 18.9% by weight;
aluminium content: 6% by weight;
chlorine content: 64% by weight;
content of organic fraction: 9.1% by weight;
ratio between titanium in its trivalent state and the sum of titanium in its trivalent and tetravalent state: 1;

Formula: $Ti_1Mg_{19}Al_{4.8}Cl_{43}RCOO_{1.25}$

EXAMPLE 9

Preparation of Catalyst Component $Ti_1Mg_{18}Al_3Cl_{39.3}RCOO_{1.4}$

The same procedure is used as in example 1 but for the different amounts of the added components:
131 mmoles (190 ml of hydrocarbon solution) of magnesium chloride versatate prepared as described in reference example 1;
8.2 mmoles (9.6 ml of solution in n-decane) of titanium chloride versatate prepared as described in reference example 12;
36.4 g (233.3 mmoles) of isobuthyl aluminium dichloride diluted with n-decane to 110 ml;
ratio between the chlorine atoms in the isobuthyl aluminium dichloride and the alkoxydic and carboxylic groups equal to 1.5/1.
Analysis:
titanium content: 2.2% by weight;
magnesium content: 20% by weight;
aluminium content: 3.7% by weight;
chlorine content: 64.8% by weight;
content of organic fraction: 11.3% by weight;
ratio between titanium in its trivalent state and the sum of titanium in its trivalent and tetravalent state: 0.97;

Formula: $Ti_1Mg_{18}Al_3Cl_{39.3}RCOO_{1.4}$

EXAMPLE 10

Preparation of Catalyst Component $Ti_1Mg_{16.4}Al_{3.5}Cl_{37.2}RCOO_{1.1}$

The same procedure is used as in example 1 but for the different amounts of the added components:
174 mmoles (550 ml of hydrocarbon solution) of magnesium chloride citronellate prepared as described in reference example 6;
10.8 mmoles (70 ml of solution in n-decane) of titanium chloride citronellate prepared as described in reference example 13;
145.3 g (587.1 mmoles) of ethyl aluminium sesquichloride diluted with n-decane to 460 ml;
ratio between the chlorine atoms in the ethyl aluminium sesquichloride and the alkoxydic and carboxylic groups equal to 3/1.
Analysis:
titanium content: 2.3% by weight;
magnesium content: 19.3% by weight;
aluminium content: 4.6% by weight;
chlorine content: 64.6% by weight;
content of organic fraction: 9.2% by weight;
ratio between titanium in its trivalent state and the sum of titanium in its trivalent and tetravalent state: 0.98;

Formula: $Ti_1Mg_{16.4}Al_{3.5}Cl_{37.2}RCOO_{1.1}$

EXAMPLE 11

Preparation of Catalyst Component $Ti_1Mg_{16.2}Al_{1.7}Cl_{36}RCOO_{0.6}$

The same procedure is used as in example 1 but for the different amounts of the added components:
202 mmoles (650 ml of hydrocarbon solution) of magnesium chloride naphthenate prepared as described in reference example 10;
12.6 mmoles (56 ml of solution in n-decane) of titanium chloride naphthenate prepared as described in reference example 15;
168.6 g (681 mmoles) of ethyl aluminium sesquichloride diluted with n-decane to 540 ml;
ratio between the chlorine atoms in the ethyl aluminium sesquichloride and the alkoxydic and carboxylic groups equal to 3/1.
Analysis:
titanium content: 2.5% by weight;
magnesium content: 20% by weight;
aluminium content: 2.4% by weight;
chlorine content: 66% by weight;
content of organic fraction: 9.1% by weight;
ratio between titanium in its trivalent state and the sum of titanium in its trivalent and tetravalent state: 0.99;

Formula: $Ti_1Mg_{16.2}Al_{1.7}Cl_{36}RCOO_{0.6}$

EXAMPLE 12

Preparation of Catalyst Component $Ti_1Mg_{16.2}Al_2Cl_{38.3}RCOO_{1.3}$

The same procedure is used as in example 1 but for the different amounts of the added components:
200 mmoles (580 ml of hydrocarbon solution) of magnesium chloride 2-ethylhexanoate prepared as described in reference example 8;
12.5 mmoles (52 ml of solution in n-decane) of titanium chloride 2-ethylhexanoate prepared as described in reference example 14;
167 g (675 mmoles) of ethyl aluminium sesquichloride diluted with n-decane to 530 ml;
ratio between the chlorine atoms in the ethyl aluminium sesquichloride and the alkoxydic and carboxylic groups equal to 3/1.
Analysis:
titanium content: 2.3% by weight;
magnesium content: 19.1% by weight;
aluminium content: 2.6% by weight;
chlorine content: 66.8% by weight;
content of organic fraction: 9.2% by weight ratio between titanium in its trivalent state and the sum of titanium in its trivalent and tetravalent state: 0.98;

Formula: $Ti_1Mg_{16.2}Al_2Cl_{38.3}RCOO_{1.3}$

EXAMPLE 13

Preparation of Component of Catalyst $Ti_1Hf_{1.93}Mg_8Al_3Cl_{32.7}RCOO_{0.8}$ 80 mmoles (148 ml of hydrocarbon solution) of magnesium chloride versatate prepared as described in reference example 3, 10 mmoles (37.5 ml of hydrocarbon solution) of titanium chloride versatate prepared as described in reference example 12 and 30 mmoles (300 ml of hydrocarbon solution) of hafnium chloride versatate prepared as described in reference example 17, are charged into a stirred 2,000 ml reactor.

Operating at room temperature, 84.1 g (340 mmoles) diluted to 290 ml with n-decane of ethyl aluminium sesquichloride (ratio between chlorine atoms in the aluminium sesquichloride and alkoxydic and carboxylic groups equal to 3/1) are slowly added, dropwise. At the end of the addition, the suspension is heated to 90° C. for 2 hours and the solid is then filtered on a porous septum of sintered glass.

19.5 g of a solid component of catalyst are obtained, which are washed with four 100 ml portions of n-heptane. The solid component of catalyst has the following characteristics:

titanium content: 2.4% by weight;
hafnium content: 17.5% by weight;
magnesium content: 9.9% by weight;
aluminium content: 4.1% by weight;
chlorine content: 59.1% by weight;
content of organic fraction: 7.0% by weight
ratio between titanium in its trivalent state and sum of titanium in its trivalent and tetravalent state: 0.92.

Expressing the components in accordance with their atomic proportions, the solid component of catalyst may be represented by the formula:

$Ti_1Hf_{1.93}Mg_8Al_3Cl_{32.7}RCOO_{0.8}$

EXAMPLE 14

Preparation of Component of Catalyst $Ti_1Zr_{1.2}Mg_8Al_{1.6}Cl_{29.8}RCOO_{0.8}$ The same procedure is used as described in example 13, starting from:

80 mmoles (148 ml of hydrocarbon solution) of magnesium chloride versatate prepared as described in reference example 3;
10 mmoles (37.5 ml of hydrocarbon solution) of titanium chloride versatate prepared as described in reference example 12;
30 mmoles (370 ml of hydrocarbon solution) of zirconium chloride versatate prepared as described in reference example 18; and
84.1 g (340 mmoles) diluted to 290 ml with n-decane, of ethyl aluminium sesquichloride (ratio between the chlorine atoms in the ethyl aluminium sesquichloride and the alkoxydic and carboxylic groups equal to 3/1).

A solid component of catalyst is obtained with the following characteristics:

titanium content: 3.1% by weight;
zirconium content: 7.2% by weight;
magnesium content: 12.8% by weight;
aluminium content: 2.9% by weight;
chlorine content: 65% by weight;
content of organic fraction: 9.0% by weight
ratio between titanium in its trivalent state and sum of titanium in its trivalent and tetravalent state: 0.92.

Formula: $Ti_1Zr_{1.2}Mg_8Al_{1.6}Cl_{29.8}RCOO_{0.8}$

EXAMPLE 15

Preparation of Component of Catalyst $Ti_1Mg_{1.1}Al_{0.22}Cl_{4.5}RCOO_{1.8}$

The same procedure is used as described in example 1, starting from:

85.6 mmoles (155 ml of hydrocarbon solution) of magnesium chloride versatate prepared as described in reference example 2;
85.6 mmoles (100 ml of hydrocarbon solution) of titanium chloride versatate prepared as described in reference example 12;
36.7 g (304.6 mmoles) of diethyl aluminium monochloride diluted in 250 ml of n-decane, (ratio between the chlorine atoms in the diethyl aluminium monochloride and the alkoxydic and carboxylic groups equal to 0.75/1).

The suspension is heated to 60° C. for 1 hour, is the cooled down and filtered on a porous septum.

A solid component of catalyst is obtained with the following characteristics:

titanium content: 8.6% by weight;
magnesium content: 4.8% by weight;
aluminium content: 0.82% by weight;
chlorine content: 25.0% by weight;
content of organic fraction: 60.8% by weight
ratio between titanium in its trivalent state and sum of titanium in its trivalent and tetravalent state: 0.9.

Formula: $Ti_1Mg_{1.1}Al_{0.22}Cl_{4.5}RCOO_{1.8}$

EXAMPLE 16

Preparation of Component of Catalyst $V_1Mg_{2.1}Cl_{5.3}RCOO_{0.2}$

The same procedure is used as described in example 1, starting from:

100 mmoles (210 ml of hydrocarbon solution) of magnesium chloride versatate prepared as described in reference example 1;
50 mmoles (635 ml of hydrocarbon solution) of vanadium chloride versatate prepared as described in reference example 16;

80.4 g (325 mmoles) of ethyl aluminium sesquichloride diluted to 235 ml with n-decane, (ratio between the chlorine atoms in the aluminium sesquichloride and the alkoxydic and carboxylic groups equal to 3.1/1).

The suspension is heated to 90° C. for 2 hours, is the cooled down and filtered on a porous septum.

14 g of a solid component of catalyst are obtained, washed with three portions of 100 ml of n-heptane. The catalyst component shows the following characteristics:

vanadium content: 16% by weight;
magnesium content: 15.2% by weight;
chlorine content: 59% by weight;
content of organic fraction: 9.8% by weight Formula: $V_1Mg_{2.1}Cl_{5.3}RCOO_{0.2}$

EXAMPLE 17

Preparation of Component of Catalyst $V_1Mg_{6.2}Al_{2.0}Cl_{15.6}RCOO_{0.5}$

The same procedure is used as described in example 16, starting from:

240 mmoles (505 ml of hydrocarbon solution) of magnesium chloride versatate prepared as described in reference example 1;
30 mmoles (381 ml of hydrocarbon solution) of vanadium chloride versatate prepared as described in reference example 16;
148.5 g (600 mmoles, 471 ml of a hydrocarbon solution) of ethyl aluminium sesquichloride diluted to 235 ml with n-decane, (ratio between the chlorine atoms in the ethyl aluminium sesquichloride and the alkoxydic and carboxylic groups equal to 3/1).

The obtained catalyst component shows the following characteristics:

vanadium content: 5.7% by weight;
magnesium content: 17% by weight;
aluminium content: 6.1% by weight;
chlorine content: 62% by weight;
content of organic fraction: 9.5% by weight Formula: $V_1Mg_{6.2}Al_{2.0}Cl_{15.6}RCOO_{0.5}$

EXAMPLE 18

Preparation of Component of Catalyst $Hf_1Mg_1Al_{0.1}Cl_{4.8}RCOO_{0.15}$

The same procedure is used as described in example 1, starting from:

200 mmoles (476 ml of hydrocarbon solution) of magnesium chloride versatate prepared as described in reference example 1;
200 mmoles (540 ml of hydrocarbon solution) of hafnium chloride versatate prepared as described in reference example 17;
210.4 g (850 mmoles) of ethyl aluminium sesquichloride diluted to 668 ml with n-decane, (ratio between the chlorine atoms in the ethyl aluminium sesquichloride and the alkoxydic and carboxylic groups equal to 3/1).

The obtained catalyst component shows the following characteristics:

hafnium content: 44.4% by weight;
magnesium content: 6.0% by weight;
aluminium content: 0.7% by weight;
chlorine content: 42.3% by weight;
content of organic fraction: 6.6% by weight Formula: $Hf_1Mg_1Al_{0.1}Cl_{4.8}RCOO_{0.15}$

EXAMPLE 19

Preparation of Component of Catalyst $Hf_1Mg_{1.7}Al_{0.7}Cl_{9.1}RCOO_{0.3}$

The same procedure is used as described in example 1, starting from:

16 mmoles (20 ml of toluene solution) of magnesium chloride 2-phenyl butyrate prepared as described in reference example 11;
16 mmoles (20 ml of toluene solution) of hafnium chloride 2-phenyl butyrate prepared as described in reference example 19;
16.8 g (68 mmoles, 50 ml of a hydrocarbon solution) of ethyl aluminium sesquichloride diluted to 235 ml with n-decane, (ratio between the chlorine atoms in the ethyl aluminium sesquichloride and the alkoxydic and carboxylic groups equal to 3/1).

The obtained catalyst component shows the following characteristics:

hafnium content: 28.9% by weight;
magnesium content: 6.7% by weight;
aluminium content: 3.0% by weight;
chlorine content: 52.3% by weight;
content of organic fraction: 9.1% by weight Formula: $Hf_1Mg_{1.7}Al_{0.7}Cl_{9.1}RCOO_{0.3}$

EXAMPLE 20

The components of catalysts of examples 1 to 12 are used in polymerization tests of ethylene operating with the suspension technique in a solvent. More specifically, the following products are charged into a stirred 5 liters reactor, in this order: 1,900 ml of anhydrous n-heptane, 0.228 g of aluminium triethyl and 5.5 mg of solid component of catalyst. The temperature of the reactor is brought to 85° C. and the reactor is pressurized with hydrogen up to a pressure of 3.2 kg/cm². Ethylene is then fed up to a pressure of 9 kg/cm² and this pressure is kept for a further two hours with a continuous feeding of ethylene. At the end of this period the polymerization is stopped and 20 ml of a 10% by weight alcohol solution of ionol is charged into the reactor.

The following values are determined:

productivity, referring to kg of polyethylene produced per gram of solid component of catalyst;
yield, referring to kg of polyethylene per gram of titanium in the solid component of catalyst;
Melt Index (MI—190° C.; 2.16 kg) of the polyethylene produced, determined in accordance with ASTM-D 1238 E, and expressed in g/10 min.;

Shear Sensitivity (SS—Ratio between the MFI measured at 21.6 and 2.16 kg) of the polyethylene produced, determined in accordance with ASTM-D 1238 E.

The results are shown in Table 1 below.

TABLE 1

| Cat. Ex. N° | Productivity | Yield | MI | SS |
|---|---|---|---|---|
| 1 | 38.2 | 1530 | 0.37 | 46 |
| 2 | 27.2 | 362 | 0.28 | 46 |
| 3 | 42.5 | 850 | 0.25 | 41 |
| 4 | 41.5 | 1204 | 0.30 | 43 |
| 5 | 35.3 | 1535 | 0.48 | 41 |
| 6 | 36.6 | 1664 | 0.48 | 40 |
| 7 | 48.1 | 2185 | 2.1 | 33 |
| 8 | 33.1 | 1655 | 0.54 | 45 |
| 9 | 50.5 | 2296 | 1.62 | 28 |
| 10 | 24.7 | 1073 | 0.24 | 47 |
| 11 | 35.3 | 1411 | 0.33 | 40 |
| 12 | 32.4 | 1413 | 0.29 | 48 |

EXAMPLE 21

The following products are charged, in this order, into a stirred 5 liters reactor: 0.6 g of aluminium triisobutyl and 36 g of solid component of catalyst prepared as described in example 13. The reactor is brought to a temperature of 85° C. and is pressurized with hydrogen up to a pressure of 7.7 kg/cm$^2$. Ethylene is then fed up to a pressure of 11 kg/cm$^2$ and these conditions are kept as such for a further 2 hours with a continuous feeding of ethylene (ratio hydrogen/ethylene 2.3). At the end of this period the polymerization is stopped and 20 ml of a 10% by weight alcohol solution of ionol is charged into the reactor.

A polyethylene is produced, with a productivity of 14.2 kg per gram of solid component and yield of 590 kg per gram of titanium in the solid component. The polyethylene has a Melt-Index of 1.03 g/10 min. and a Shear Sensitivity value of 92 (ASTM D-1238, E).

EXAMPLE 22

The same procedure is used as in polymerization example 21, with the catalyst of example 13 and with a ratio hydrogen/ethylene of 0.57.

A polyethylene is produced, having a productivity of 25.2 kg per gram of solid component of catalyst and yield of 1050 kg per gram of titanium in the solid component. The polyethylene shows a Melt-Index of 0.2 g/10 min. and a Shear Sensitivity of 15 (ASTM D-1238, P).

EXAMPLE 23

The same procedure is used as in polymerization example 21, with a ratio hydrogen/ethylene of 1.94 and with the catalyst of example 14.

A polyethylene is produced, having a productivity of 12.4 kg per gram of solid component of catalyst and yield of 400 kg per gram of titanium in the solid component. The polyethylene shows a Melt-Index of 5.2 g/10 min. and a Shear Sensitivity of 60 (ASTM D-1238, E).

EXAMPLE 24

The same procedure is used as in polymerization example 20, by using 16.9 of the solid component of the catalyst of example 15, a polimerization temperature of 90° C., a total pressure of 10 kg/cm$^2$ and with a ratio hydrogen/ethylene of 0.71.

A polyethylene is produced, having a productivity of 25.3 kg per gram of solid component and yield of 294 kg per gram of titanium in the solid component. The polyethylene shows a Melt-Index of 6.8 g/10 min. and a Shear Sensitivity of 29.5 (ASTM D-1238, E).

EXAMPLE 25

Into a stirred 1 liter reactor there are charged, in order: 500 ml of anhydrous n-heptane, 0.1 g of aluminium triisobutyl (0.5 ml of a 1 molar solution) and the temperature of the reactor is brought to 50° C. The reactor is pressurized with propylene to 4 kg/cm$^2$. When the phase equilibrium, has been reached the feeding of propylene is interrupted and the solid component of catalyst of example 15 in a quantity of 2.8 mg, is pushed inside the reactor with a flow of ethylene up to a pressure of 5 kg/cm$^2$. The polymerization is continued for 0.5 hours and is then interrupted by introducing 20 ml of a 10% by weight alcohol solution of ionol into the reactor.

An ethylene-propylene copolymer is produced with a yield of 159.2 kg per gram of titanium in the solid component of catalyst and per hour. The copolymer has an intrinsic viscosity, calculated in decaline at 135° C., of 3.3 dl/g. The composition of the copolymer determined by nuclear magnetic resonance is: propylene units 37.6% by weight (28.7% in moles), ethylene units 62.4% by weight (71.3% in moles).

EXAMPLE 26

The same procedure is used as in polymerization example 20 with the solid component of catalyst of example 16 (16.2 mg) and with aluminium triisobutyl (3 mmoles, 0.6 g), and under the following conditions: temperature 80° C., total pressure 8 kg/cm$^2$, ratio hydrogen/ethylene 0.13.

A polyethylene is obtained with a productivity of 0.33 kg per gram of solid component and a yield of 5.77 kg per gram of vanadium in the solid component. The polymer has a Melt-Index of 0.135 g/10 min. and a Shear Sensitivity of 17 (ASTM D-1238, P).

EXAMPLE 27

The same procedure is used as in polymerization example 20 with the solid component of catalyst of example 17 (11.6 mg) and with aluminium triisobutyl (0.16 g, 0.8 mmoles), and under the following conditions: temperature 80° C., ethylene pressure 3 kg/cm$^2$ and time equal to 2 hours.

A polyethylene is obtained with a productivity of 3.5 kg per gram of solid component and of 61.8 kg per gram of vanadium in the solid component.

EXAMPLE 28

The same procedure is used as in polymerization example 20 with the solid component of catalyst of example 18 under the following conditions: temperature 85° C., total pressure 11 kg/cm$^2$ and hydrogen/ethylene ratio equal to 1.3.

A polyethylene is obtained with a yield of 5.4 kg per gram of hafnium in the solid component.

EXAMPLE 29

The same procedure is used as in polymerization example 20 with 141 mg of the solid component of catalyst of example 19, under the following conditions: temperature 85° C., total pressure 11 kg/cm$^2$ and hydrogen/ethylene ratio equal to 1.3.

A polyethylene is obtained with a yield of 11 kg per gram of hafnium in the solid component.

EXAMPLE 30

The solid component of catalyst prepared as described in example 1, is used in a copolymerization test of ethylene and butene-1, operating in continuous, at a high pressure and temperature.

More specifically a reactor vessel with a capacity of 0.5 liters is used, equipped with a turbine stirrer, a breakwater and thermostat system. The following currents are fed into the top of the reactor:
- a flow of ethylene and butene-1 (ratio by weight 32:68) at a total rate of 25 kg/hour;
- a solution of aluminium triethyl in hexane (concentration 9 mmoles/liter), in a quantity of about 0.06 mmoles of aluminium triethyl for every kg of total gas (ethylene and butene-1);
- a suspension in vaseline and paraffin oil of the solid component of catalyst prepared in example 1, in a quantity of 11.1 mg of dry catalyst per kg of total gas (ethylene-butene-1), equal to 0.0063 mmoles of titanium for every kg of total gas.

The feeding temperature of the reagents is 60° C., with a polymerization temperature of 230° C., the stirrer operating at 1,700 revs/minute, with an average residence time of the reagents in the reactor of about 40 seconds, at a pressure of 1,200 kg/cm$^2$.

The copolymerization product is discharged in continuous from the bottom of the reactor and subjected to an initial flash in a separator at high pressure (300 kg/cm$^2$), followed by a second flash in a separator at low pressure (1–5 kg/cm$^2$). A deactivator of the catalytic system (glycerine) is injected at the outlet of the reactor. The unreacted monomers, separated in the flash treatment, are recycled, after being purified and reintegrated with fresh monomers. The copolymer is recovered using an extruder connected to a low pressure separator.

The operation in continuous is carried out for 48 hours, and the following results are obtained:
- conversion of monomers per passage: 15.2% by weight;
- average hourly production of the ethylene-butene-1 copolymer: 3.8 kg/hour;
- Melt Flow Index of the copolymer (190° C., 2.16 kg): 4.2 dg/min. (ASTM-D 1238, E);
- Shear Sensitivity of the copolymer: 33 ASTM-D 1238, E;
- density of the copolymer measured at 23° C.: 0.9244 g/ml
- yield in kg of the copolymer per gram of titanium: 500

EXAMPLE 31

The same procedure is used as in example 30, with a polymerization temperature of 210° C., with a weight ratio ethylene/butene-1 at feeding of 32/68 and with an atomic ratio Al/Ti in the catalyst equal to 8. A 12.8% by weight conversion of the monomers per passage is obtained and 3.2 kg/hour of an ethylene/butene-1 copolymer are produced, with a yield of 700 Kg/g Ti, having a Melt-Flow Index of 1.7 dg/min., a Shear Sensitivity of 32 and a density of 0.9232 g/ml.

EXAMPLE 32

The same procedure is used as in example 30, with a polymerization temperature of 240° C., with a weight ratio ethylene/butene-1 at feeding of 32/68 and with an atomic ratio Al/Ti in the catalyst equal to 5. A 16.4% by weight conversion of the monomers per passage is obtained and 4.1 kg/hour of an ethylene/butene-1 copolymer are produced, with a yield of 420 Kg/g Ti, having a Melt-Flow Index of 6.5 dg/min., and a density of 0.9211 g/ml.

EXAMPLE 33

The same procedure is used as in example 30, with a polymerization temperature of 225° C., with a weight ratio ethylene/butene-1 at feeding of 20/80 and with an atomic ratio Al/Ti in the catalyst equal to 5. A 14.4% by weight conversion of the monomers per passage is obtained and 3.6 kg/hour of an ethylene/butene-1 copolymer are produced, with a yield of 400 Kg/g Ti, having a Melt-Flow Index of 7.8 dg/min., a Shear Sensitivity of 38 and a density of 0.9060 g/ml.

EXAMPLE 34

The same procedure is used as in example 30, with a polymerization temperature of 214° C., with a weight ratio ethylene/butene-1 at feeding of 22/78 and with an atomic ratio Al/Ti in the catalyst equal to 6. A 12.0% by weight conversion of the monomers per passage is obtained and 3.0 kg/hour of an ethylene/butene-1 copolymer are produced, with a yield of 833 Kg/g Ti, having a Melt-Flow Index of 3.1 dg/min. and a density of 0.9079 g/ml.

EXAMPLE 35

The same procedure is used as in example 30, with a polymerization temperature of 211° C., with a weight ratio ethylene/butene-1 at feeding of 20/80 and with an atomic ratio Al/Ti in the catalyst equal to 5. A 13.2% by weight conversion of the monomers per passage is obtained and 3.3 kg/hour of an ethylene/butene-1 copolymer are produced, with a yield of 893 Kg/g Ti, having a Melt-Flow Index of 2.7 dg/min. and a density of 0.9014 g/ml.

EXAMPLE 36

The same procedure is used as in example 30, with a polymerization temperature of 205° C., with a weight ratio ethylene/butene-1 at feeding of 13/87 and with an atomic ratio Al/Ti in the catalyst equal to 4. A 12.4% by weight conversion of the monomers per passage is obtained and 3.1 kg/hour of an ethylene/butene-1 copolymer are produced, with a yield of 575 Kg/g Ti, having a Melt-Flow Index of 6.2 dg/min. and a density of 0.8897 g/ml.

EXAMPLE 37

The same procedure is used as in example 30, with a polymerization temperature of 205° C., with a weight ratio ethylene/butene-1 at feeding of 8/92 and with an atomic ratio Al/Ti in the catalyst equal to 5. A 14.4% by weight conversion of the monomers per passage is obtained and 3.6 kg/hour of an ethylene/butene-1 copolymer are produced, with a yield of 530 Kg/g Ti, having a density of 0.8760 g/ml and a Melt-Flow Index of 22.8 dg/min.

EXAMPLE 38

The same procedure is used as in example 30, by using the solid component of catalyst of example 13, with a polymerization temperature of 230° C., with a weight ratio ethylene/butene-1 at feeding of 28/72 and with an atomic ratio Al/Ti in the catalyst equal to 8. A 12.8% by weight conversion of the monomers per passage is obtained and 3.2 kg/hour of an ethylene/butene-1 copolymer are produced, with a yield of 450 Kg/g Ti, having a a Melt-Flow Index of 0.5 dg/min, a Shear Sensitivity of 45 and a density of 0.921 g/ml.

EXAMPLE 39

The solid component of catalyst prepared as described in example 1, is used in a copolymerization test of ethylene and propylene, operating in continuous, at a high pressure and temperature. More specifically, the same procedure is used as in example 30, feeding 30 kg/hour of a flow of ethylene and propylene with a weight ratio between them of 35/65 and with an inlet temperature of 60° C. The polymerization is carried out at 220° C. and with an atomic ratio Al/Ti in the catalyst of 6. An 11% by weight conversion of the monomers per passage is obtained and 3.3 kg/hour of an ethylene-propylene copolymer are produced with a yield of 550 kg/g Ti, with a Melt-Flow Index of 15 dg/min. and a density of 0.895 g/ml.

EXAMPLE 40

400 ml of n-heptane containing 0.158 g (0.8 ml of a 1 molar solution) of aluminium triisobutyl are charged into a stirred 1 liter reactor. The temperature is brought to 65° C. and 7.6 mg of the solid component of catalyst prepared in example 1, is fed and pushed inside the reactor with propylene, up to a pressure of 5 kg/cm$^2$. The pressure is maintained and the propylene fed for a further 4 hours. At the end of this period, the polymerization is interrupted and 20 ml of a 10% by weight alcohol solution of ionol is fed into the reactor.

Polypropylene is produced with a productivity of 7.0 kg per gram of solid component and a yield of 278.9 kg per gram of titanium in the solid component.

EXAMPLE 41

The following products are charged, in order, into a stirred 0.5 liter reactor: 300 ml of n-heptane, 30 g (46 ml) of 4-methyl-1-pentene and 0.109 g of aluminium triisobutyl. The temperature is brought to 60° C. and 17.3 g of the solid component of catalyst prepared in example 1 are introduced. The polymerization is continued for 1 hour and then interrupted and 20 ml of a 10% by weight alcohol solution of ionol are fed into the reactor.

Poly(4-methyl-1-pentene) is produced with a productivity of 1.5 kg per gram of solid component and a yield of 58.6 kg per gram of titanium in the solid component. The polymer has an intrinsic viscosity in decaline at 135° C. of 5.7 dl/g.

EXAMPLE 42

The same procedure is used as described in example 41, charging 17.3 mg of the solid component of catalyst prepared in example 3.

Poly(4-methyl-1-pentene) is produced with a productivity of 1.21 kg per gram of solid component and a yield of 24.2 kg per gram of titanium in the solid component. The polymer has an intrinsic viscosity in decaline at 135° C. of 5.9 dl/g.

EXAMPLE 43

The following products are charged, in order, into a stirred 0.5 liter reactor: 300 ml of n-heptane, 35 g of 1-hexene and 0.099 g of aluminium triisobutyl. At a temperature of 25° C., 19.2 mg of the solid component of catalyst prepared in example 1 are then added. The polymerization is continued for 1 hour and is then interrupted and 20 ml of a 10% by weight alcohol solution of ionol are introduced into the reactor.

Poly(1-hexene) is produced with a productivity of 1.28 kg per gram of solid component and a yield of 50.8 kg per gram of titanium in the solid component. The polymer has an intrinsic viscosity in decaline at 135° C. of 2.1 dl/g.

COMPARATIVE EXAMPLE 1

A solid component of catalyst is prepared according to the general procedure described in example 1, starting from:

176.8 mmoles (18.9 g) of a support of magnesium chloride having the characteristics specified in the description, 11.0 mmoles (13.0 ml) of a solution of titanium chloride versatate prepared as described in reference example 12, (content of titanium 856.1 mmoles/l), 16.3 g (66.2 mmoles) diluted to 52 ml with n-decane, of ethyl aluminium sesquichloride (ratio between the chlorine atoms in the ethyl aluminium sesquichloride and the alkoxydic and carboxylic groups equal to 3/1).

A solid component of catalyst is obtained with the following characteristics:

titanium content: 2.4% by weight;

magnesium content: 20.8% by weight;

aluminium content: 2.7% by weight;

chlorine content: 72% by weight;

content of organic fraction: 2.1% by weight.

Formula: $Ti_1Mg_{17}Al_2Cl_{39.9}$

This solid component of catalyst is used in a polymerization test of ethylene carried out under the conditions of polymerization example 20.

The following values are determined:

productivity 16.0 kg of polyethylene per gram of solid component of catalyst;

yield 666 kg of polyethylene per gram of titanium in the solid component of catalyst;

Melt Index 1.0 g/10 min. (ASTM-D 1238, E);

Shear Sensitivity 36 (ASTM-D 1238, E).

COMPARATIVE EXAMPLE 2

A solid component of catalyst is prepared starting from spray-dried ethanol magnesium chloride, titanium tetrachloride and diethyl aluminium chloride, in accordance with example 1 of European Patent Application publication 243.327.

This solid component of catalyst is used in a polymerization test of ethylene carried out under the conditions of polymerization example 20.

The following values are determined:

productivity 18.1 kg of polyethylene per gram of solid component of catalyst;

yield 604 kg of polyethylene per gram of titanium in the solid component of catalyst;

Melt Index 1.1 g/10 min. (ASTM-D 1238, E),

Shear Sensitivity 35 (ASTM-D 1238,E).

COMPARATIVE EXAMPLE 3

A solid component of catalyst is prepared starting from spray-dried ethanol magnesium chloride, titanium tetra-n-butylate and diethyl aluminium chloride, in accordance with U.S. Pat. No. 4,843,049.

Formula: $Ti_1Mg_{0.96}Al_{0.46}Cl_{3.96}(Et+OEt+OBu)_{2.23}$

The solid component of catalyst is used in a polymerization test of ethylene according to example 24.

A polyethylene is produced with a productivity of 12.1 kg per gram of solid component of catalyst and a yield of 100 kg per gram of titanium in the solid component. The polyethylene has a Melt-Index value of 6.6 g/10 min. and a Shear Sensitivity value of 27.2 (ASTM D-1238, E).

COMPARATIVE EXAMPLE 4

A solid component of catalyst is prepared following the general procedure described in example 13, starting from:

23 mmoles (7.8 g) of titanium tetra-n-butylate, 34.6 mmoles (16.3 g) of hafnium tetra-n-butylate, 184 mmoles (19.7 g) of chlorine support having the characteristics specified in the description, 68.5 g (276.4 mmoles) of ethyl aluminium sesquichloride (ratio between the chlorine atoms in the aluminium sesquichloride and the alkoxydic groups equal to 3/1).

A solid component of catalyst is obtained with the following characteristics:

titanium content: 2.9% by weight;

hafnium content: 16.3% by weight;

magnesium content: 12.7% by weight;

aluminium content: 0.8% by weight;

chlorine content: 58.2% by weight;

content of organic fraction: 9.1% by weight.

$Ti_1Hf_{1.5}Mg_{8.6}Al_{0.5}Cl_{27}$

This solid component of catalyst is used in a polymerization test of ethylene carried out under the conditions of polymerization test 21, operating with a ratio hydrogen/ethylene of 2.35.

The following values are determined:

productivity 3.2 kg of polyethylene per gram of solid component of catalyst;

yield 111 kg of polyethylene per gram of titanium in the solid component of catalyst;

Melt Index 0.05 g/10 min. (ASTM-D 1238,E),

Shear Sensitivity 222 (ASTM-D 1238, E).

COMPARATIVE EXAMPLE 5

The solid component of catalyst of the known method described in comparative example 3, is used.

This solid component of catalyst is used in a copolymerization test of ethylene according to example 30, operating at a polymerization temperature of 235° C., with a weight ratio ethylene-butene-1 at feeding of 32/68 and with an atomic ratio between the aluminium in the cocatalyst and the titanium in the solid component of catalyst equal to 23. A 13.2% by weight conversion of monomers is obtained and 3.4 kg/hour of a copolymer of ethylene-butene-1 are produced, with a yield of 221 kg/g Ti, having a Melt-Flow Index of 4.2 dg/min., a Shear Sensitivity of 30 and a density of 0.9235 g/ml.

The test is repeated operating at a temperature of 210° C. A 10.4% by weight conversion of the monomers is obtained and 2.6 kg/hour of a copolymer of ethylene-butene-1 are produced, with a yield of 322 Kg/g Ti, having a Melt-Flow Index of 1.1 dg/min., a Shear Sensitivity of 31 and a density of 0.9214 g/ml.

What is claimed is:

1. A solid component of a catalyst for the (co) polymerization of ethylene and α-olefins, which contains magnesium-carboxylate bonds and transition metal-carboxylate bonds; which is represented by the formula $$M_1Mg_{(0.3-20)}X_{(2-60)}Al_{(0-6)}(R-COO)_{(0.1-3)} \qquad (I);$$

and which is prepared by the steps of:

(a) forming a solution, in an inert organic solvent, of a magnesium carboxylate or a magnesium carboxylate halogenide having the formula $MgX_n(R-COO)_{2-n}$ (II), where n ranges from 0 to 1, and at least one transition metal carboxylate or transition metal carboxylate halogenide having the formula $MX_m(R-COO)_{4-m}$ (III), where the atomic ratio between the magnesium in (II) and the transition metal in (III) is from 0.3:1 to 20:1;

(b) adding to the solution an aluminum alkyl halide (IV), where the alkyl group is a linear or branched alkyl group containing 1–20 carbon atoms and the halide group is a halide other than an iodide group, to precipitate the solid component of the catalyst, where the atomic ratio between the halide in (IV) and the total carboxyl groups in (II) and (III) is from 0.3:1 to 10:1; and (c) recovering the solid component in a granular form; where M in formulas (I) and (III) is at least one transition metal selected from the group consisting of titanium or a mixture of titanium and zirconium or hafnium, with the atomic ratio between the titanium and the zirconium or hafnium being 0.25:1 to 2:1 and wherein the aluminum alkyl halide has the formula $AlR'_pX_{(3-p)}$, where R' is the $C_1$–$C_{20}$ linear or branched alkyl group, X is the halide group other than the iodide group, and p is between 1 and 2;

X in formulas (I), (II), (III), and (IV) is a halogen other than iodine;

R in formulas (I), (II), and (III) is an aliphatic, cycloalipathic, or aromatic radical containing at least 4 carbon atoms; and m is from 0 to 2.

2. A solid component of the catalyst according to claim 1, wherein the halide X is chloride or bromide and wherein p is 1, 1.5, or 2.

3. A process for the preparation of the solid component (I) of a catalyst for (co)polymerizing ethylene and α-olefins, which contains magnesium carboxylate bonds and transition metal carboxylate bonds and is represented by the formula $M_1Mg_{(0.3-20)}X_{(2-60)}Al_{(0-6)}(R-COO)_{(0.1-3)}$ (I), which process comprises the steps of:

(a) forming a solution, in an inert organic solvent, of a magnesium carboxylate or a magnesium carboxylate halogenide having the formula $MgX_n(R-COO)_{(2-n)}$ (II) and of at least one transition metal carboxylate or transition metal carboxylate halogenide having the formula $MX_m(R-COO)_{(4-m)}$ (III) where:

M is at least one transition metal selected from the group consisting of titanium, vanadium, zirconium and hafnium;

X is a halogen other than iodine;

R is an aliphatic, cycloaliphatic or aromatic hydrocarbon radical containing at least 4 carbon atoms and up to about 25 carbon atoms;

n is to 1;

m is 0 to 2;

the atomic ratio between the magnesium in (II) and the transition metal in (III) is from 0.3:1 to 20:1; and the solvent is an aliphatic, cycloaliphatic, or aromatic hydrocarbon solvent;

(b) precipitating the solid component (I) by adding to the solution of step (a) an aluminum alkyl halide (IV) having the formula $AlR'_p X_{(3-p)}$, where R' is the $C_1$–$C_{20}$ linear or branched alkyl group, X is the halide group other than the iodide group, and p is between 1 and 2, and where the ratio between the halide in (IV) and the total carboxyl groups in (II) and (III) is from 0.3:1 to 10:1; and (c) recovering the solid component in granular form.

4. A process according to claim 3, wherein the aluminum alkyl halide is selected from the group consisting of aluminum alkyl chlorides and bromides and the alkyl contains from 1 to 6 carbon atoms and wherein p is 1, 1.5, or 2.

5. A process according to claim 4, wherein the alkyl aluminum halide is selected from the group consisting of ethyl aluminum dichloride, diethyl aluminum chloride, ethyl aluminum sesquichloride, isobutyl aluminum, dichloride, ethyl aluminum dibromide and diethyl aluminum bromide.

6. A process according to claim 3, wherein the solvent is selected from hexane, heptane, octane, nonane, decane, undecane, dodecane, cyclopentane, cyclohexane, benzene, toluene, xylenes and mesithylenes.

* * * * *

UNITED STATES PATENT AND TRADEMARK OFFICE
CERTIFICATE OF CORRECTION

PATENT NO.    : 6,730,627 B1                                      Page 1 of 1
DATED         : May 4, 2004
INVENTOR(S)   : Masi et al.

It is certified that error appears in the above-identified patent and that said Letters Patent is hereby corrected as shown below:

Title page,
Delete Item "[*] Notice: Subject to any disclaimer, the term of this patent is extended or adjusted under 35 U.S.C. 154(b) by 1, 826 days."

Signed and Sealed this

Thirteenth Day of July, 2004

JON W. DUDAS
*Acting Director of the United States Patent and Trademark Office*